(12) United States Patent
Dunphy et al.

(10) Patent No.: US 8,351,755 B2
(45) Date of Patent: Jan. 8, 2013

(54) OPTICAL WAVEGUIDE FEEDTHROUGH ASSEMBLY

(75) Inventors: James R. Dunphy, South Glastonbury, CT (US); John J. Grunbeck, Northford, CT (US); Trevor MacDougall, Simsbury, CT (US); Matthew J. Patterson, Glastonbury, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 13/270,903

(22) Filed: Oct. 11, 2011

(65) Prior Publication Data

US 2012/0087629 A1 Apr. 12, 2012

Related U.S. Application Data

(63) Continuation of application No. 12/826,328, filed on Jun. 29, 2010, now Pat. No. 8,068,714, which is a continuation of application No. 11/932,139, filed on Oct. 31, 2007, now Pat. No. 7,747,126.

(60) Provisional application No. 60/863,869, filed on Nov. 1, 2006.

(51) Int. Cl.
*G02B 6/00* (2006.01)

(52) U.S. Cl. ............ 385/138; 385/12; 385/53; 385/55; 385/58; 385/60; 385/70; 385/78; 385/99; 385/139

(58) Field of Classification Search .......... 385/12, 385/53, 55, 58, 60, 70, 78, 99, 138–139
See application file for complete search history.

(56) References Cited

U.S. PATENT DOCUMENTS

| 4,095,101 | A | | 6/1978 | Lemelson |
| 4,295,707 | A | | 10/1981 | Nakai et al. |
| 4,413,881 | A | * | 11/1983 | Kovats ........................... 385/94 |
| 4,682,846 | A | * | 7/1987 | Cowen ......................... 385/138 |
| 4,775,212 | A | | 10/1988 | Smith |
| 4,822,130 | A | | 4/1989 | Maranto et al. |
| 4,896,939 | A | | 1/1990 | O'Brien |
| 5,024,503 | A | | 6/1991 | Gunn et al. |
| 5,033,808 | A | | 7/1991 | Smith et al. |
| 5,091,987 | A | * | 2/1992 | MacCulloch et al. ......... 385/66 |
| 5,170,459 | A | | 12/1992 | Norton et al. |
| 5,521,331 | A | | 5/1996 | Hillburn |

(Continued)

FOREIGN PATENT DOCUMENTS

EP 0316473 5/1989

(Continued)

OTHER PUBLICATIONS

GB Search Report for Application Serial No. GB0721499.2, dated Feb. 28, 2008.

*Primary Examiner* — Brian M. Healy
*Assistant Examiner* — Guy Anderson
(74) *Attorney, Agent, or Firm* — Patterson & Sheridan, LLP

(57) ABSTRACT

An optical fiber feedthrough assembly includes a glass plug disposed in a recess of a feedthrough housing. The glass plug may define a large-diameter, cane-based, waveguide sealed within the recess in the housing and providing optical communication through the housing. Sealing occurs with respect to the housing at or around the glass plug of an optical waveguide element passing through the housing by braze sealing to the glass plug and/or embedding the glass plug in a polymer bonded with the plug to form a molded body that is sealed in the housing by, for example, compression mounting of the molded body or providing a sealing element around the molded body.

19 Claims, 8 Drawing Sheets

U.S. PATENT DOCUMENTS

| | | | |
|---|---|---|---|
| 5,562,838 A | 10/1996 | Wojnarowski et al. | |
| 5,588,086 A * | 12/1996 | Fan | 385/138 |
| 6,427,046 B1 | 7/2002 | Bickford et al. | |
| 6,445,868 B1 | 9/2002 | Grunbeck et al. | |
| 6,463,198 B1 | 10/2002 | Coleman et al. | |
| 6,526,212 B1 | 2/2003 | Mishriky et al. | |
| 6,643,446 B2 | 11/2003 | Moidu et al. | |
| 6,665,477 B2 | 12/2003 | Toth et al. | |
| 6,788,873 B2 | 9/2004 | Fritz et al. | |
| 6,888,972 B2 * | 5/2005 | Berg et al. | 385/12 |
| 7,369,716 B2 | 5/2008 | Berg et al. | |
| 7,430,881 B2 | 10/2008 | Bryant et al. | |
| 7,500,793 B2 | 3/2009 | Patel et al. | |
| 2003/0099453 A1 * | 5/2003 | Moidu et al. | 385/138 |
| 2004/0165841 A1 | 8/2004 | Fernald et al. | |
| 2004/0202401 A1 | 10/2004 | Berg et al. | |
| 2006/0269211 A1 | 11/2006 | Patel et al. | |
| 2007/0003206 A1 | 1/2007 | Dunphy et al. | |

FOREIGN PATENT DOCUMENTS

| | | |
|---|---|---|
| GB | 2409289 | 6/2005 |
| GB | 2427911 | 1/2007 |

\* cited by examiner

OPTICAL WAVEGUIDE FEEDTHROUGH ASSEMBLY

CROSS-REFERENCE TO RELATED APPLICATIONS

This application is a continuation of U.S. patent application Ser. No. 12/826,328 filed Jun. 29, 2010 now U.S. Pat. No. 8,068,714, which is a continuation of U.S. patent application Ser. No. 11/932,139 filed Oct. 31, 2007, now U.S. Pat. No. 7,747,126, issued Jun. 29, 2010, which claims benefit of U.S. Provisional Patent Application Ser. No. 60/863,869, filed Nov. 1, 2006, all of which are herein incorporated by reference.

BACKGROUND OF THE INVENTION

1. Field of the Invention

Embodiments of the invention generally relate to feedthroughs for optical waveguides.

2. Description of the Related Art

Many industries and applications utilize apparatus where small diameter wires and/or optical waveguides penetrate a wall, bulkhead, or other feedthrough member wherein a relatively high fluid or gas differential pressure exists across the feedthrough member. In addition, one or both sides of the feedthrough member may be subjected to relatively high temperatures and other harsh environmental conditions, such as corrosive or volatile gas, fluids and other materials. For example, a bulkhead feedthrough may require sealing an optical waveguide at high pressures of about 138,000 kilopascal (kPa) and above, and high temperatures of about 150° C. to 300° C., with a service life of 5 to 20 or more years.

Several problems exist with constructing such an optical fiber feedthrough. One of these problems involves the susceptibility of the glass fiber to damage and breakage due to its small size, flexibility and brittle nature. A feedthrough based on soldered or epoxy secured fiber passing through a ferrule may result in premature failure during demanding applications due to damage, stress and weakening of the fiber caused by assembly processes and/or design characteristics of the feedthrough. Further, the glass-to-sealing material interface may create thermal stress problems that affect performance of the seal and/or optical characteristics of the fiber since the coefficient of thermal expansion of the optical fiber is essentially zero unlike surrounding materials of the feedthrough.

Therefore, there exists a need for an improved optical waveguide feedthrough assembly.

SUMMARY OF THE INVENTION

For some embodiments, an optical waveguide feedthrough assembly includes a housing having a bore extending therethrough, an optical waveguide element having a first section with an outer diameter larger than a second section of the waveguide element, and a material selected to at least substantially fill a void space between the waveguide element and the bore of the housing, wherein a bond between the material and an outer surface of the first section of the waveguide element seals between the material and the waveguide element.

In some embodiments, a method of forming an optical waveguide feedthrough assembly includes providing a housing having a bore extending therethrough and an optical waveguide element having a first section with an outer diameter larger than a second section of the waveguide element, and bonding a material to an outer surface of the first section of the waveguide element thereby sealing between the material and the waveguide element, wherein the material at least substantially fills in between the waveguide element and the bore of the housing.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally relate to optical fiber feedthrough assemblies applicable for use in high temperature, high pressure environments. In one embodiment, a feedthrough assembly includes a glass plug disposed in a recess of a feedthrough housing. The glass plug may define a large-diameter, cane-based, waveguide sealed within the recess in the housing and providing optical communication through the housing. All embodiments described herein provide for sealing with respect to the housing at or around the glass plug of an optical waveguide element passing through the housing by braze sealing to the glass plug and/or embedding the glass plug in a polymer bonded with the plug to form a molded body that is sealed in the housing by, for example, compression mounting of the molded body or providing a sealing element around the molded body.

As used herein, "optical fiber," "glass plug" and the more general term "optical waveguide" refer to any device for transmitting optical signals along a desired pathway. For example, each of these terms can refer to single mode, multi-mode, birefringent, polarization maintaining, polarizing, multi-core or multi-cladding optical waveguides, or flat or planar waveguides. The optical waveguides may be made of any glass, e.g., silica, phosphate glass, or other glasses, or made of glass and plastic, or solely plastic. Furthermore, any of the optical waveguides can be partially or completely coated with a gettering agent and/or a blocking agent (such as gold) to provide a hydrogen barrier that protects the waveguide.

Figure 1:
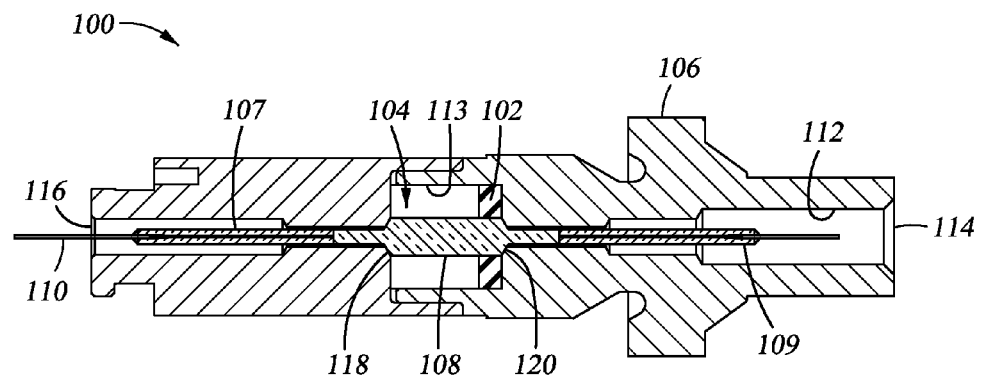
FIG. 1 is a cross section of a feedthrough assembly with a sealing material bonded to an optical waveguide disposed in a housing of the assembly to pass the waveguide to opposite sides of the feedthrough assembly, according to embodiments of the invention.

FIG. 1 shows a feedthrough assembly 100 with a sealing material 102 bonded to a glass plug 108 of an optical waveguide 104 disposed in a housing 106 of the assembly 100 to pass the waveguide 104 to opposite sides of the feedthrough assembly 100. The optical waveguide 104 passes through a passageway 112 through the housing 106. The optical waveguide element 104 includes the glass plug 108 defining a large-diameter, cane-based, optical waveguide preferably having an outer diameter of about 3 millimeters (mm) or greater. The glass plug 108 can have appropriate core and cladding dimensions and ratios to provide the desired outer large-diameter.

For some embodiments, first and second fiber pigtails 107, 109 extend from each end of the glass plug 108. Each of the pigtails 107, 109 preferably include an optical waveguide such as an optical fiber 110 encased or embedded in a carrier or larger diameter glass structure allowing the fiber 110 to be optically coupled to the glass plug 108. U.S. patent application Ser. No. 10/755,722, entitled "Low-Loss Large-Diameter Pigtail," now U.S. Pat. No. 7,430,881 issued Oct. 7, 2008, and hereby incorporated by reference in its entirety, describes exemplary pigtails that can facilitate subsequent optical connection of the fiber 110 to other fibers, connectors, or other optical components by suitable splicing techniques known in the art. Further, U.S. application Ser. No. 10/755,708, entitled "Large Diameter Optical Waveguide Splice," which is herein incorporated by reference in its entirety, describes a large-diameter splice suitable for splicing the fiber pigtails 107, 109 to the glass plug 108. For some embodiments, the glass plug 108 can be spliced to or otherwise optically coupled with fibers in optical communication with each end of the glass plug 108 by other techniques and methods.

Sealing of the optical waveguide element 104 with respect to the housing 106 occurs at and/or around the glass plug 108 to enable isolation of fluid pressure in communication with a first end 114 of the passageway 112 from fluid pressure in communication with a second end 116 of the passageway 112. This sealing of the glass plug 108 with respect to the housing 106 provides the feedthrough capabilities of the feedthrough assembly 100. As described herein, a solder or brazing material brazed to the glass plug 108 or a structural polymer injection or compression molded or epoxied around the glass plug 108 forms the sealing material 102. The housing 106 may trap first and second outward facing shoulders 118, 120 of the glass plug 108 within a cavity 113. With the sealing material 102 bonded to the glass plug 108, sealing contact between the sealing material 102 and an inside surface of the cavity 113 thereby seals the waveguide 104 within the passageway 112.

Brazing of a fiber, as opposed to the glass plug 108, requires stripping of buffer material and recoating with a metal, which typically weakens the fiber and imposes microscopic damage. Further, the solder and brazing materials induce stresses into the fiber as the molten material cools and freezes around the fiber. Residual processing stresses and application bending stresses may exceed the residual strength of an optical fiber weakened by a metallization process to enable the brazing. However, the glass plug 108 mitigates bending due to rigidity of the plug 108 relative to fiber and averages the residual processing stresses over a larger surface area and volume relative to fiber. Therefore, the feedthrough 100 using the glass plug 108 brazed in the housing 106 functions without premature failure.

With respect to the sealing material 102 that is made of the structural polymer instead of the solder, the glass plug 108 facilitates prevention of application bending stresses that may still present a problem for fiber based feedthrough designs. Further, seal stress transfer to the glass plug 108 that may occur again averages over a larger surface area and volume relative to applications with fiber. These seal stresses may derive from differences in thermal coefficients of expansion between components of the assembly 100 and/or compression of the sealing material 102 around the plug 108. Examples of the structural polymer may include any polymeric material, such as identified below, capable of providing mechanical support to the glass plug 108.

Figure 2:
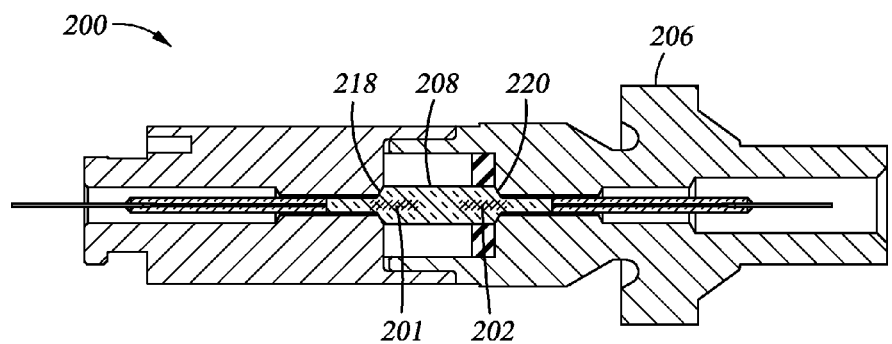
FIG. 2 is a cross section of sensors disposed within an exemplary optical waveguide feedthrough assembly shown as the assembly in FIG. 1, according to embodiments of the invention.

FIG. 2 illustrates first and second sensors 201, 202 disposed within an exemplary feedthrough assembly 200 shown analogous to the assembly 100 in FIG. 1. However, any of the feedthrough assemblies described herein may incorporate respective sensors such as the sensors 201, 202. The sensors 201, 202 reflect or transmit an optical signal in response to a parameter being measured and may include any optical sensing element, such as a Bragg grating, disposed within a glass plug 208. The first and second sensors 201, 202 are disposed within the glass plug 208 proximate respective interfaces/sealing regions 218, 220 between the housing 206 and the glass plug 208. Each of the sensors 201, 202 may span a length of the glass plug 208 across the corresponding feature that the sensor is proximate.

The first and second sensors 201, 202 generate signals that may enable monitoring of temperature and/or pressure for such purposes as diagnostic operations. This detection ability allows real-time monitoring of the state of the feedthrough assembly 200. Information derived from the sensors 201, 202 can be beneficial both during fabrication of the feedthrough assembly 200 and during use thereof.

Figure 3:
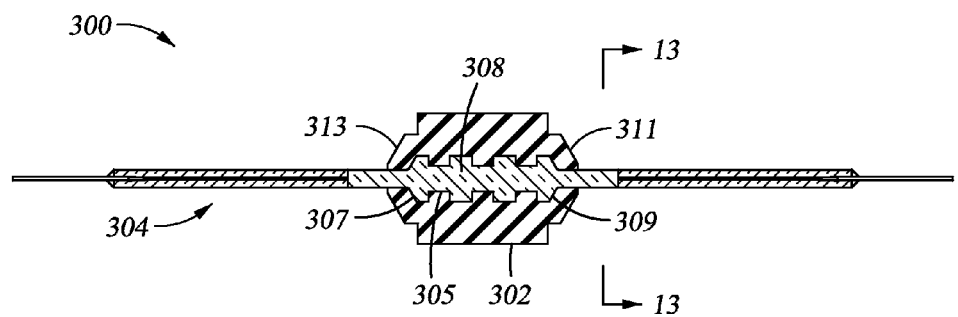
FIG. 3 is a cross section of a molded body that includes a varied outer diameter optical waveguide surrounded by a polymer prior to placement of the molded body in a housing, according to embodiments of the invention.
Figure 4:
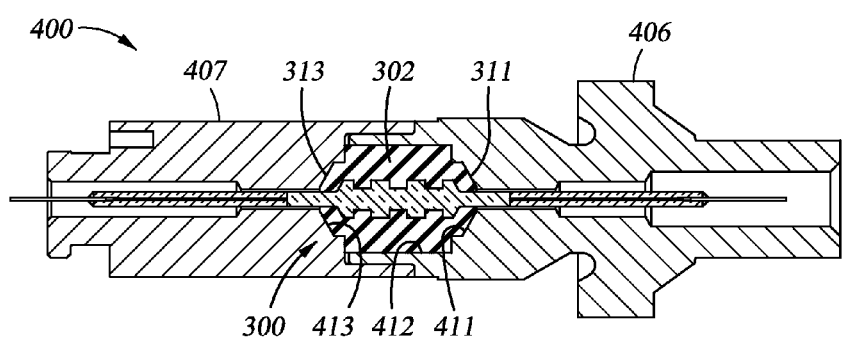
FIG. 4 is a cross section of the molded body shown in FIG. 3 compression mounted in the housing to form a feedthrough assembly, according to embodiments of the invention.

FIG. 3 shows a molded body 300 prior to enclosing the molded body 300 within first and second housings 406, 407 (shown in FIG. 4). The molded body 300 includes a glass plug 308 surrounded by a polymer 302 along a length of the glass plug 308 having a varied outer diameter. Machining of the glass plug 308 creates a shape of the plug 308 that facilitates redundant seal surfaces when embedded in the polymer 302 and aids in avoiding stress transfer to the glass plug 308. Such machining cannot occur with fiber to accomplish these benefits that are achieved by providing the glass plug 308 with this varied outer diameter profile.

The glass plug 308 may include a plurality of circumferential grooves 305. The grooves 305 help retain the plug 308 embedded in the polymer 302 and increase multidirectional interface surfaces between the plug 308 and polymer 302 for sealing and stress distribution. Further, the glass plug 308 may include a conical shaped first tapered surface 309 corresponding to a cone shaped first male end 311 of the polymer 302. For bidirectional designs, an opposite side of the molded body 300 may also have the glass plug 308 with a conical shaped second tapered surface 307 corresponding to a cone shaped second male end 313 of the polymer 302.

The polymer 302 of the molded body 300 may be constructed from a polymeric material, which may be an insulative thermoplastic, such as polyetherketone (PEK), polyetheretherketone (PEEK), polyaryletherketone (PAEK), polyetherketoneketone (PEKK), polyphenylene sulfide (PPS), polybenzimidazole (PBI), liquid crystal polymer (LCP), or polyamidimide (PAI). For some embodiments, an epoxy bonds the polymer 302 to the glass plug 308. Bonding between the glass plug 308 and the polymer may also result from injection or compression molding of the polymer 302 around the glass plug 308.

In a fabrication procedure for the molded body 300 according to some embodiments, the glass plug 308 is heated and placed into a mold (not shown) prior to injecting polymeric material into the mold. The polymeric material is heated to at least about 260° C. or to about 370° C. prior to injecting the polymeric material into the mold at a pressure of at least about 51,700 kilopascal (kPa) or about 124,100 kPa. Following the injection step, the molded body 300 may be heated to relieve stress in the polymer 302 so that post-cooling contraction of the molded body 300 does not tend to distort the glass plug 308. The heating may be to a minimum of the rated operating temperature (e.g., about 200-260° C. for application in a downhole well). Following the stress relief, the entire assembly cools whereby the polymer 302 of the molded body 300 shrinks, forms a bond with the glass plug 308, and captures the grooves 305. The foregoing method to manufacture the molded body 300 may be applied to other molded bodies described herein that have optical waveguides embedded in a polymer.

FIG. 4 illustrates the molded body 300 compression mounted in the housings 406, 407 to form a feedthrough assembly 400. Ends of the first and second housings 406, 407 mate together along corresponding features, which are secured in a mated position by, for example, welding and/or a threaded relationship between the corresponding features of the housing 406, 407. Before the housings 406, 407 are coupled and affixed together, the molded body 300 is disposed in a recess 412 formed in the end of the first housing 406. Dimensions of the recess 412 substantially match an outer shape of the polymer 302. Further, the first and second housings include respective concave conical first and second tapered seats 411, 413 complimentary to respective ones of the first and second male ends 311, 313 of the polymer 302. Due to oversize of the polymer 302 relative to a distance between the seats 411, 413 when the housings 406, 407 are in the mated position, the polymer 302 of the molded body 300 compresses into sealing contact with the first tapered seat 411, the second tapered seat 413 and/or the recess 412.

Figure 5:
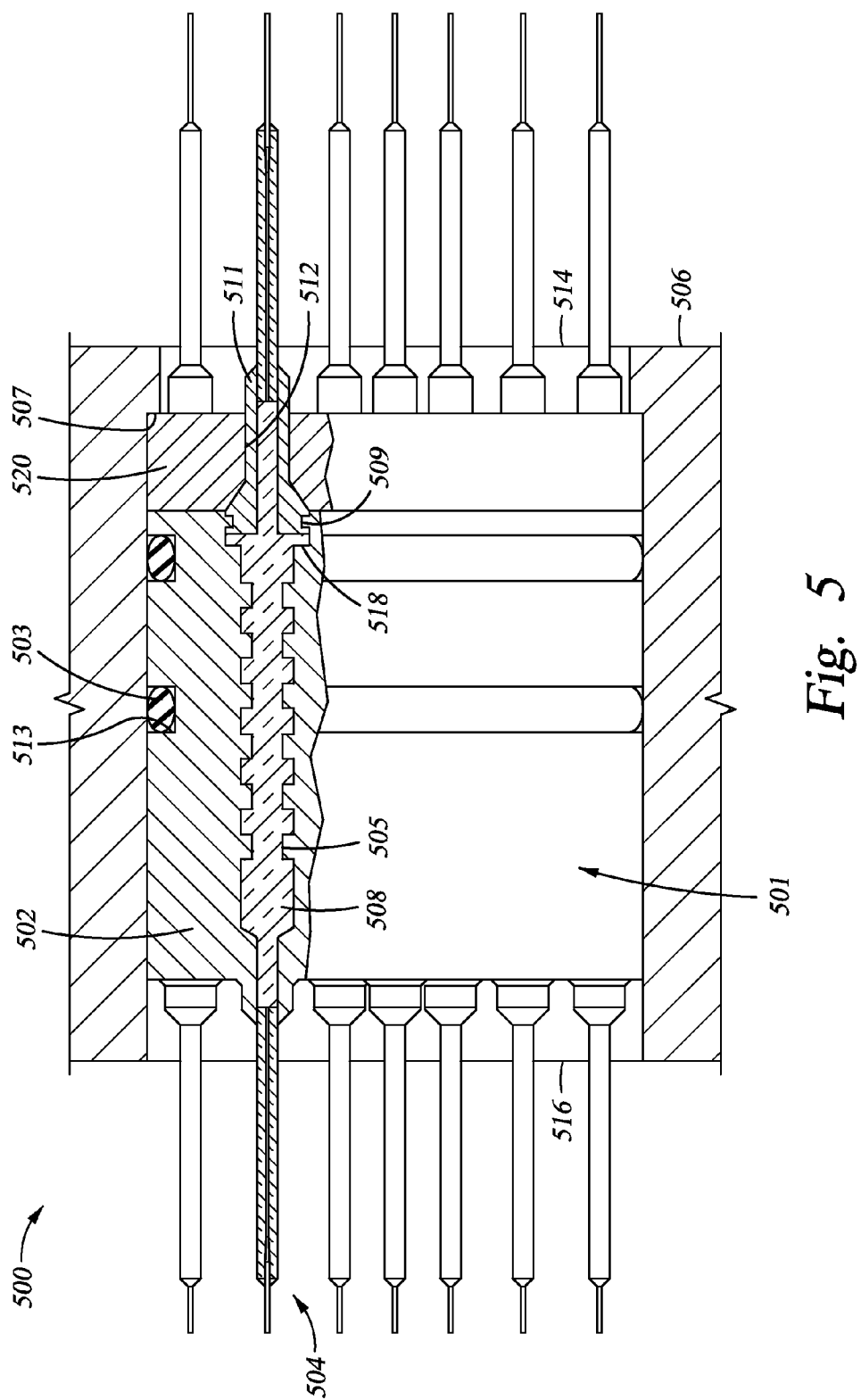
FIG. 5 is a cross section of a feedthrough assembly with a sealing element surrounding a molded body that includes an optical waveguide and is disposed in a housing of the assembly to pass the waveguide to opposite sides of the feedthrough assembly, according to embodiments of the invention.

FIG. 5 shows a feedthrough assembly 500 with sealing elements 503 surrounding a molded body 501. The molded body 501 includes one or a plurality of optical waveguides 504 and is disposed in a housing 506 of the assembly 500 to pass the waveguides 504 to opposite sides of the feedthrough assembly 500. A polymeric material 502 supports and provides mechanical retention of respective glass plugs 508 of the plurality of optical waveguides 504 set within the polymeric material 502. The polymeric material 502 may be injection molded or compression molded to the glass plugs 508 or each of the plugs 508 may be affixed to the polymeric material by epoxy.

The molded body 501 further includes a transverse support member 520 having a plurality of passages 512 through which the glass plugs 508 separately pass. Each glass plug 508 may be surrounded by an insulating sleeve 511 which separates each glass plug 508 from the support member 520. An outer circumference of the support member 520 seats against a pressure bearing inward facing ledge 507 of the housing 506 to transfer load from the polymeric material 502 and optical waveguides 504 to the housing 506.

The feedthrough assembly 500 enables isolation of fluid pressure in communication with an open high pressure first end 516 of the housing 506 from fluid pressure in communication with an open low pressure second end 514 of the housing 506. Each glass plug 508 includes one or a plurality of circumferential grooves 505 and an outward shoulder 518. The shoulder 518 bears against the insulating sleeve 511 to facilitate transfer of the differential pressure load imposed on the glass plug 508 from the first end 516 to the second end 514.

The transverse support member 520 may be permanently joined to the housing 506 with, for example, a weld or threaded engagement. Further, the transverse support member 520 may be made from any rigid material that supports the optical waveguides 504 when subjected to pressure differentials. For some embodiments, the support member 520 is formed from a metallic material, such as a hardened stainless steel alloy. According to some embodiments, the support member 520 may be fabricated from ceramic materials such as transformation toughened zirconia ("TTZ"), alumina and other ceramics.

The insulating sleeves 511 each may include at least one circumferential groove 509 therein. The groove 509 assists in retaining the insulating sleeve 511, the optical waveguide 504 and the transverse support member 520 to the polymeric material 502. For some embodiments, the insulating sleeve 511 affixes to the support member 520. Further, the insulating sleeves 511 may be fabricated from a variety of materials including polymers, such as those used to make the polymeric material 502.

In a fabrication procedure for the feedthrough assembly 500, the glass plugs 508, the insulating sleeves 511 and the transverse support member 520 may all be heated and placed within a mold. The polymeric material 502 is then placed into the mold for creating the molded body 501 which surrounds the glass plugs 508. Once the molded body 501 is formed, the polymeric material 502 may form a bond with the glass plugs 508, the insulating sleeves 511 and the transverse support member 520 and captures any formations that may be shaped on any of these components.

Sealing occurs between the housing 506 and the molded body 501 and may be facilitated by the sealing element 503, such as an elastomeric band or an O-ring, either alone or combined with a backup ring. The molded body 501 may include at least one circumferential groove 513 in an external surface of the polymeric material 502. Each of the grooves 513 houses a respective one of the sealing elements 503 so as to form a seal between the molded body 501 and the housing 506.

Figure 6:
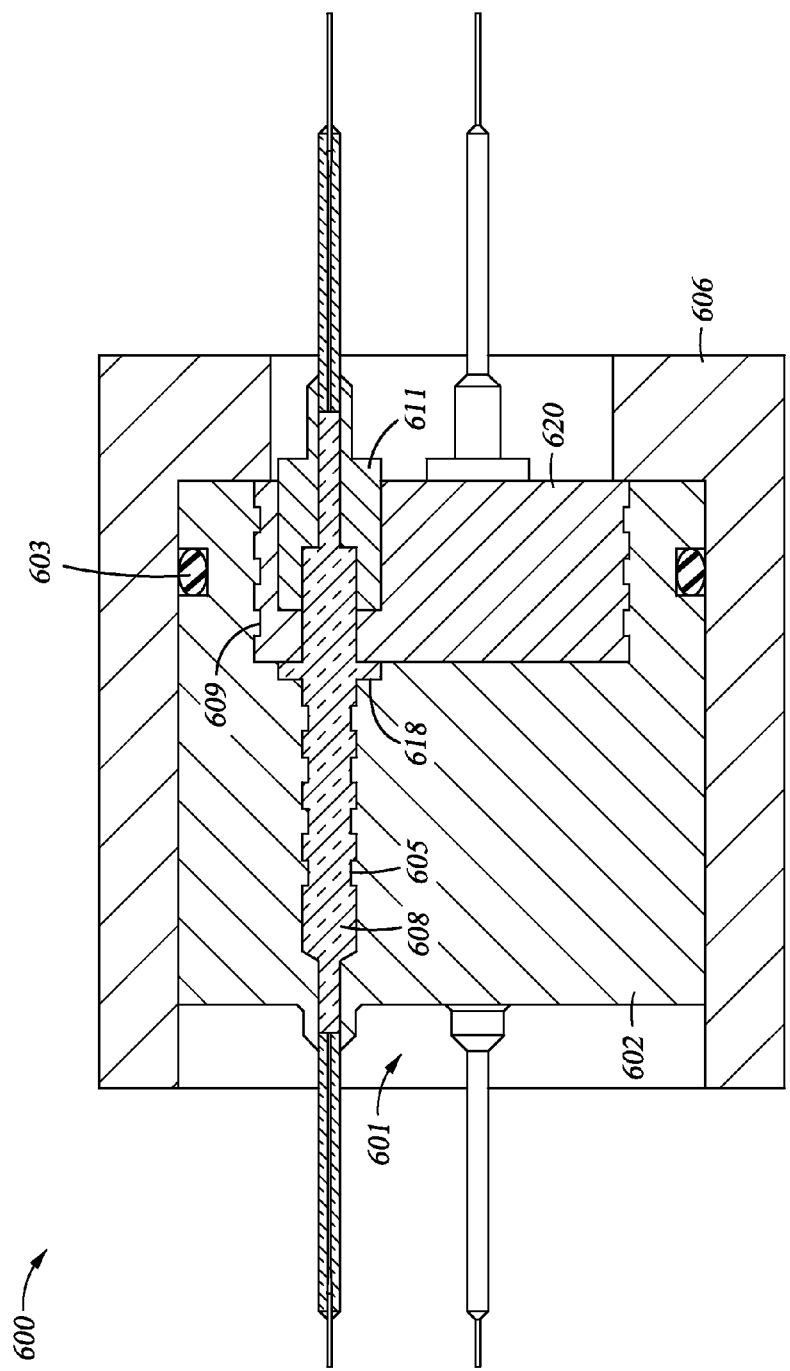
FIG. 6 is a cross section of another feedthrough assembly with a sealing element surrounding a molded body that includes an optical waveguide and is disposed in a housing of the assembly to pass the waveguide to opposite sides of the feedthrough assembly, according to embodiments of the invention.

FIG. 6 illustrates another feedthrough assembly 600 with a sealing element 603 surrounding a molded body 601 to seal the molded body 601 within a housing 606. The molded body 601 includes a glass plug 608 with grooves 605 and an outward shoulder 618 embedded in a polymeric material 602. In addition, the molded body 601 includes a support member 620, which may provide insulation. Features, such as grooves 609, on the support member 620 facilitate structural coupling within the molded body 601 between the polymeric material 602 and the support member 620. The shoulder 618 of the glass plug 608 bears against the support member 640 by direct contact. Further, an insulating sleeve 611 may be located on the glass plug 608 on a low pressure side of the support member 640.

Figure 7:
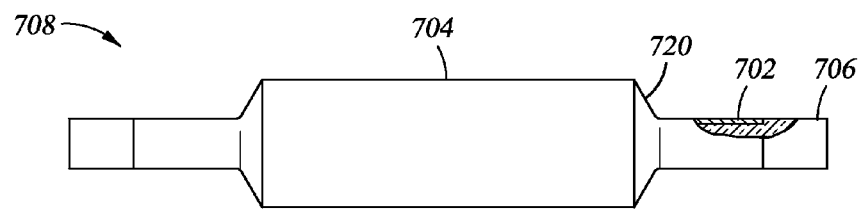
FIG. 7 is an optical waveguide with a metal coating on an outer surface of the waveguide utilized to fabricate a brazed feedthrough assembly, according to embodiments of the invention, according to embodiments of the invention.

FIG. 7 shows a glass plug 708 with a metal coating 702 on an outer surface of the plug 708 that is ground or machined prior to metallization to have a cylindrical first section 704 with a larger outer diameter relative to a cylindrical second section 706. The second section 706 couples in optical communication to a fiber 910 (shown in FIG. 9) with a further reduced outer diameter relative to the second section 706. A transition section 720 may taper from the first section 704 of the plug 708 to the second section 706 of the plug 708.

Figure 8:
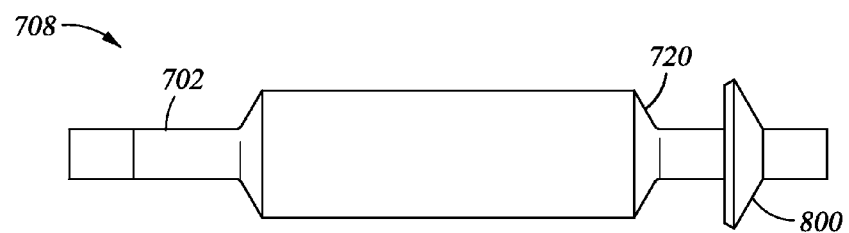
FIG. 8 is the waveguide shown in FIG. 7 after installing a solder or brazing material adjacent an area of the waveguide to be sealed in a housing, according to embodiments of the invention.
Figure 9:
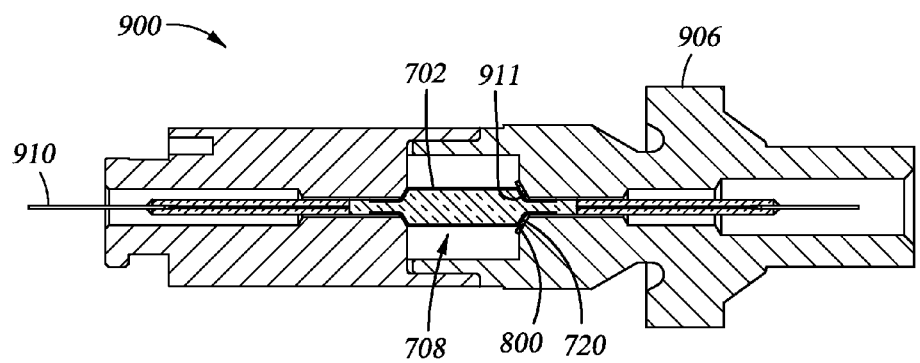
FIG. 9 is the waveguide shown in FIG. 8 after locating the waveguide and the solder or brazing material in the housing, according to embodiments of the invention.
Figure 10:
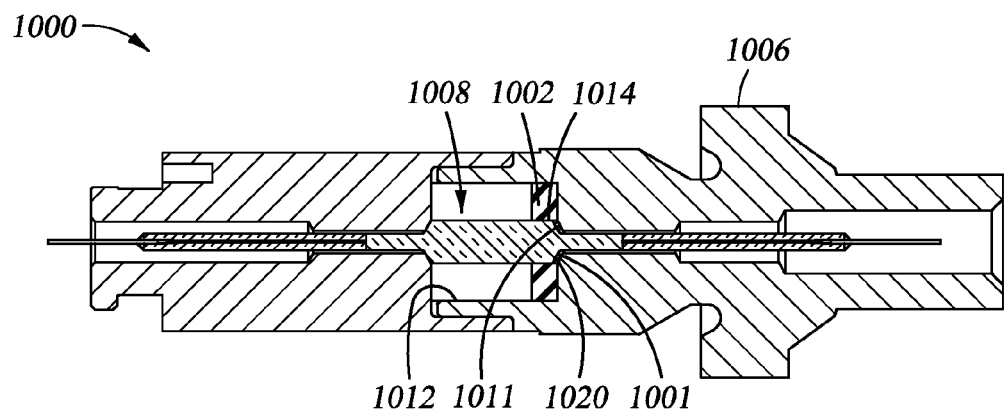
FIG. 10 is a feedthrough assembly with a first section of an optical waveguide brazed in a conical seat of a housing and further sealed with respect to the housing by a sealing material bonded to a second section of the optical waveguide along an outer surface of the waveguide, according to embodiments of the invention.
Figure 11:
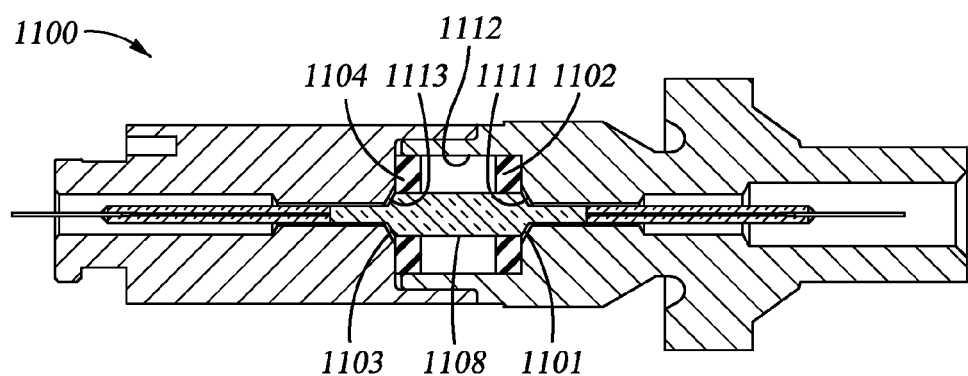
FIG. 11 is a feedthrough assembly utilizing redundant interface sealing based on seal options as illustrated in FIG. 10, according to embodiments of the invention.

FIG. 8 illustrates the glass plug 708 after installing a braze or solder material 800 adjacent the transition section 720 of the glass plug 708 to be sealed in a housing 906 (shown in FIG. 9). The solder material 800 forms an annular ring surrounding the glass plug 708 at the transition section 720 and/or at other outer body surfaces along the plug 708, such as depicted in FIGS. 10 and 11. The metal coating 702 on the plug permits brazing of the glass plug 708 as described herein since the metal coating 702 is wettable by the solder material 800.

FIG. 9 shows the glass plug 708 after being located with the solder material 800 in the housing 906 to assemble a brazed feedthrough assembly 900. The transition section 720 seats against a complimentary concave conically tapered seat 911 of the housing 906. During manufacturing, heating the feedthrough assembly 900, such as with an oven, heating coil, or induction heater, causes the solder material 800 to melt and flow between the glass plug 708 and the housing 906 to seal an interface between the glass plug 708 and the housing 906 upon subsequent cooling of the solder material 800.

FIG. 10 illustrates a feedthrough assembly 1000 with a tapered first section 1020 of a glass plug 1008 brazed with a solder 1001 in a conical seat 1011 of a housing 1006 and further sealed with respect to the housing 1006 by a sealing material 1002 bonded to a sidewall second section 1014 of the glass plug 1008. The sealing material 1002 may include additional soldering material disposed around the plug 1008 within a cavity 1012 of the housing 1006. For some embodiments, the sealing material 1002 may include a structural polymer, such as PEEK, molded around the plug 1008 to bond the sealing material 1002 with the plug 1008.

FIG. 11 shows a feedthrough assembly 1100 utilizing redundant interface sealing with seal options as illustrated in FIG. 10 opposed in a bidirectional manner. The feedthrough assembly 1100 includes brazes 1101, 1103 in respective first and second conical seats 1111, 1113 of a housing 1106 to seal a glass plug 1108 with respect to the housing 1006. One or more further sections of the plug 1108 may be sealed with respect to the housing 1106 by one or more sealing materials 1102, 1104 bonded to respective sidewall sections of the glass plug 1108. The sealing material 1002 may include additional soldering material or a structural polymer, such as PEEK, molded around the plug 1008 to bond the sealing material 1002 with the plug 1008.

Figure 12:
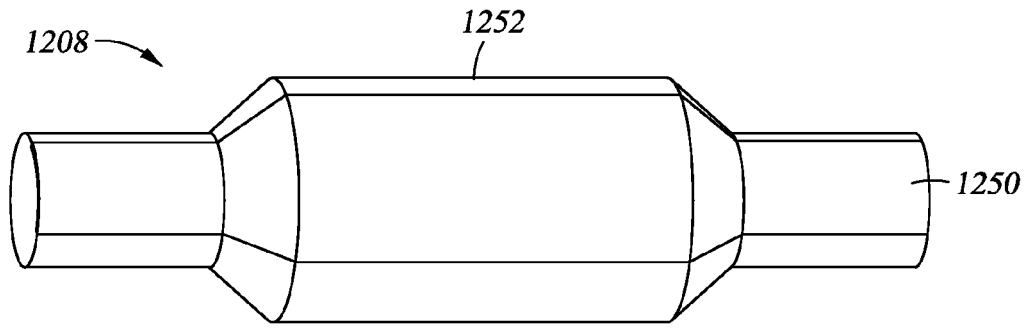
FIG. 12 is an optical waveguide element that may be incorporated in any of the feedthrough assemblies to permit simultaneous electrical connection across the feedthrough assembly due to a conductive contact formed along the waveguide element, according to embodiments of the invention.

FIG. 12 illustrates an optical waveguide element 1208 that may be incorporated in any feedthrough assembly to permit simultaneous optical and electrical connection across the feedthrough assembly. The waveguide element 1208 may be analogous to, for example, the glass plug 308 shown in FIG. 3, except that the waveguide element 1208 includes a conductive contact 1250 formed along the waveguide element 1208. A glass portion 1252 of the waveguide element 1208 still permits shaping of the waveguide element 1208 and optical transmission through the waveguide element 1208 like other glass plugs described herein.

The conductive contact 1250 may be deposited on the waveguide element 1208 after forming an outermost glass layer or during deposition of the outer glass making up the waveguide element 1208. For some embodiments, masking during fabrication of the waveguide element 1208 enables selective deposition of the contact 1250 at identified circumferential and/or radial locations of the waveguide element 1208. The contact 1250 may define a circumferential coaxial type connector or one or more longitudinal strips separated around the waveguide element 1208. The waveguide element 1208 may pass through the feedthrough housing in a manner that is electrically isolated from the housing based on the descriptions heretofore where insulators, such as PEEK, disposed around the glass plugs support the plugs in the feedthroughs.

Figure 13:
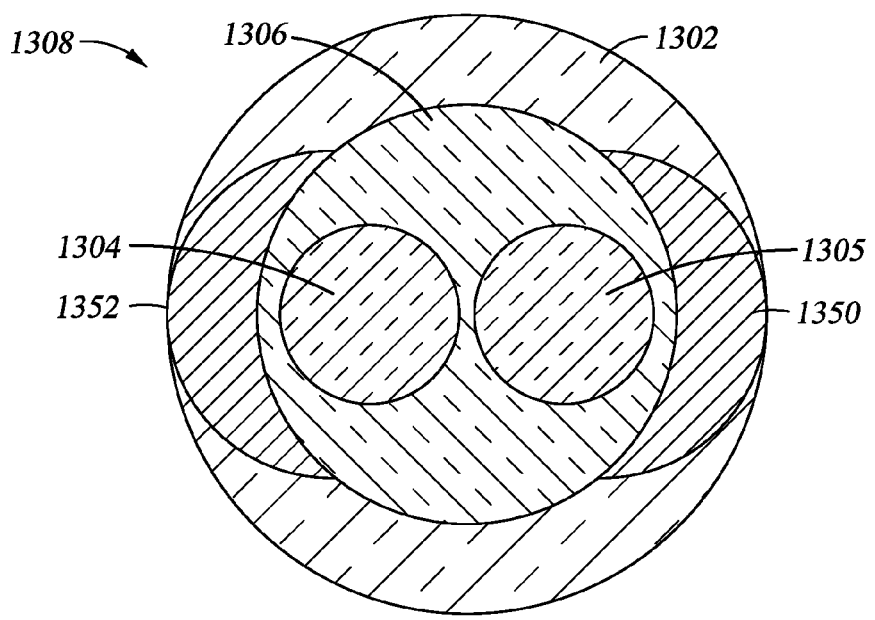
FIG. 13 is a cross section of a multiple optical pathway waveguide element that may be incorporated in any of the feedthrough assemblies to permit simultaneous multiple electrical connections across the feedthrough assembly due to multiple conductive contacts formed along the waveguide element, according to embodiments of the invention.

FIG. 13 shows a cross section of a multiple optical pathway waveguide element 1308 that may be incorporated in any feedthrough assembly to permit simultaneous multiple optical and electrical connections across the feedthrough assembly due to multiple optical pathways and conductive contacts formed along the waveguide element 1308. For example, the glass plug 308 shown in FIG. 3 may represent the waveguide element 1308 with the cross section taken across line I-I. The waveguide element 1308 includes first and second optical cores 1304, 1305 that permit separate propagation of light through the waveguide element 1308. An inner cladding layer 1306 surrounds the cores 1304, 1305. In addition to the optical cores 1304, 1305, the waveguide element 1308 also includes first and second electrical contacts 1350, 1352 disposed within an outer cladding layer 1302 and spaced around the waveguide element 1308.

In applications that braze the waveguide element 1308 to the housing of the feedthrough, the contacts 1350, 1352 may be disposed inward within the waveguide element 1308 relative to outer glass portions of the waveguide element 1308 that have undergone metallization for brazing. With reference to FIG. 1, the cross section shown in FIG. 13 may represent, for example, a cross section of the glass plug 108 opposite the second shoulder 120 from the sealing material 102 (i.e., analogous to line I-I in FIG. 3) such that sealing material 102 brazes to further radial extending glass of the plug 108 relative to the contacts 1350, 1352. For some embodiments having the waveguide element 1308 insulated from the housing of the feedthrough, the cross section illustrated in FIG. 13 may correspond to a largest outer diameter section of the waveguide element 1308.

Figure 14:
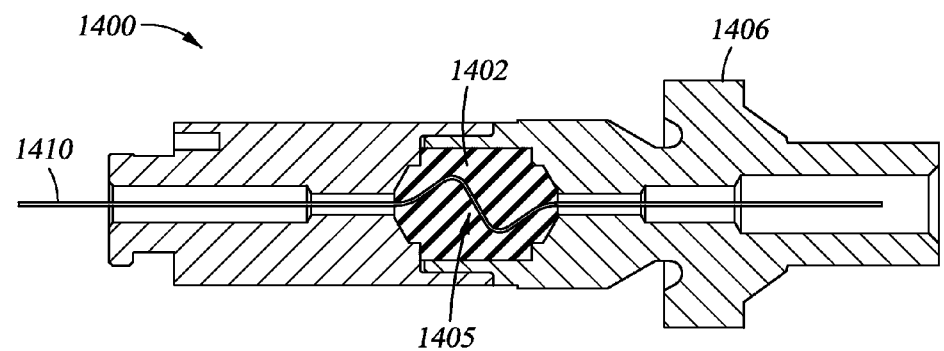
FIG. 14 is a cross section of a feedthrough assembly with a molded body that includes an optical fiber surrounded by a fill material, according to embodiments of the invention.

FIG. 14 shows a feedthrough assembly 1400 with a molded body that includes an optical fiber 1410 surrounded by a fill material 1402. Similar to the feedthrough assembly 400 in FIG. 4, a housing 1406 may trap the fill material 1402 in a sealing manner by compression or squeezing of the fill material 1402. For some embodiments, the fill material 1402 may include PEEK, other polymer or a ductile metal. During forming of the fill material 1402 around the fiber 1410, a path of the fiber 1410 may be maintained with identified curvatures 1405 disposed inside the fill material 1402. This orientation of the fiber 1410 after setting of the fill material 1402 may facilitate preventing micro-bending of the fiber 1410 disposed inside the fill material 1402 upon placement within the housing 1406 and operation of the feedthrough assembly 1400.

Any of the feedthrough assemblies shown may include one or more features of any of the embodiments described herein since for conciseness the exemplary drawings may lack representation of every specific different combination of these features. Furthermore, U.S. patent application Ser. No. 11/172,616, filed Jun. 30, 2005, which is herein incorporated by reference, describes various modifications that may be implemented with the aforementioned feedthrough assemblies. While the foregoing is directed to embodiments of the present invention, other and further embodiments of the invention may be devised without departing from the basic scope thereof, and the scope thereof is determined by the claims that follow.

What is claimed is:

1. An optical waveguide feedthrough assembly, comprising:
    a housing having a passageway extending therethrough;
    a large diameter optical waveguide disposed in the passageway and comprising at least one core and a cladding, wherein the cladding has an outer diameter of about 3 mm or greater; and
    a material configured to seal a space between the optical waveguide and an inner surface of the housing.

2. The assembly of claim 1, wherein the material comprises a solder or a brazing compound brazed to the optical waveguide.

3. The assembly of claim 1, wherein the material comprises a body that is molded around the optical waveguide.

4. The assembly of claim 3, wherein the molded body comprises a polymeric material.

5. The assembly of claim 3, wherein the cladding comprises a length with a varied outer diameter along which the molded body is bonded to the optical waveguide.

6. The assembly of claim 3, wherein the cladding comprises a circumferential groove along which the molded body is bonded to the optical waveguide.

7. The assembly of claim 3, wherein an epoxy bonds the molded body to the optical waveguide.

8. The assembly of claim 1, wherein the material comprises polyetheretherketone (PEEK).

9. The assembly of claim 1, further comprising a sealing element disposed around the material to seal between the material and the inner surface of the housing.

10. The assembly of claim 9, wherein the sealing element is disposed in a circumferential grove in the material.

11. The assembly of claim 9, wherein the sealing element comprises an elastomeric band or an O-ring.

12. The assembly of claim 1, further comprising a sleeve disposed between the optical waveguide and the material.

13. The assembly of claim 1, further comprising at least one sensor disposed in the waveguide along a portion of the optical waveguide disposed in the passageway.

14. The assembly of claim 1, wherein the optical waveguide comprises at least one electrical contact integrated therein.

15. The assembly of claim 1, wherein the optical waveguide comprises multiple optical cores and multiple electrical contacts integrated therein.

16. The assembly of claim 1, further comprising a solder or a brazing compound brazed to a first section of the optical waveguide, wherein the material is configured to seal the space between a second section of the optical waveguide and the inner surface of the housing.

17. The assembly of claim 16, wherein the first section comprises a tapered section of the optical waveguide that mates with a conical seat of the housing.

18. The assembly of claim 1, wherein the optical waveguide comprises a glass plug and first and second fiber pigtails extending from each end of the glass plug for facilitating optical connection of the optical waveguide to optical fibers.

19. The assembly of claim 1, wherein the material is configured to isolate fluid pressure in communication with a first end of the passageway from fluid pressure in communication with a second end of the passageway.

* * * * *